Jan. 20, 1970  A. CZARNECKI ET AL  3,490,610
AUTOMATIC FRAME STACKING DEVICE
Filed Sept. 20, 1965  6 Sheets-Sheet 1
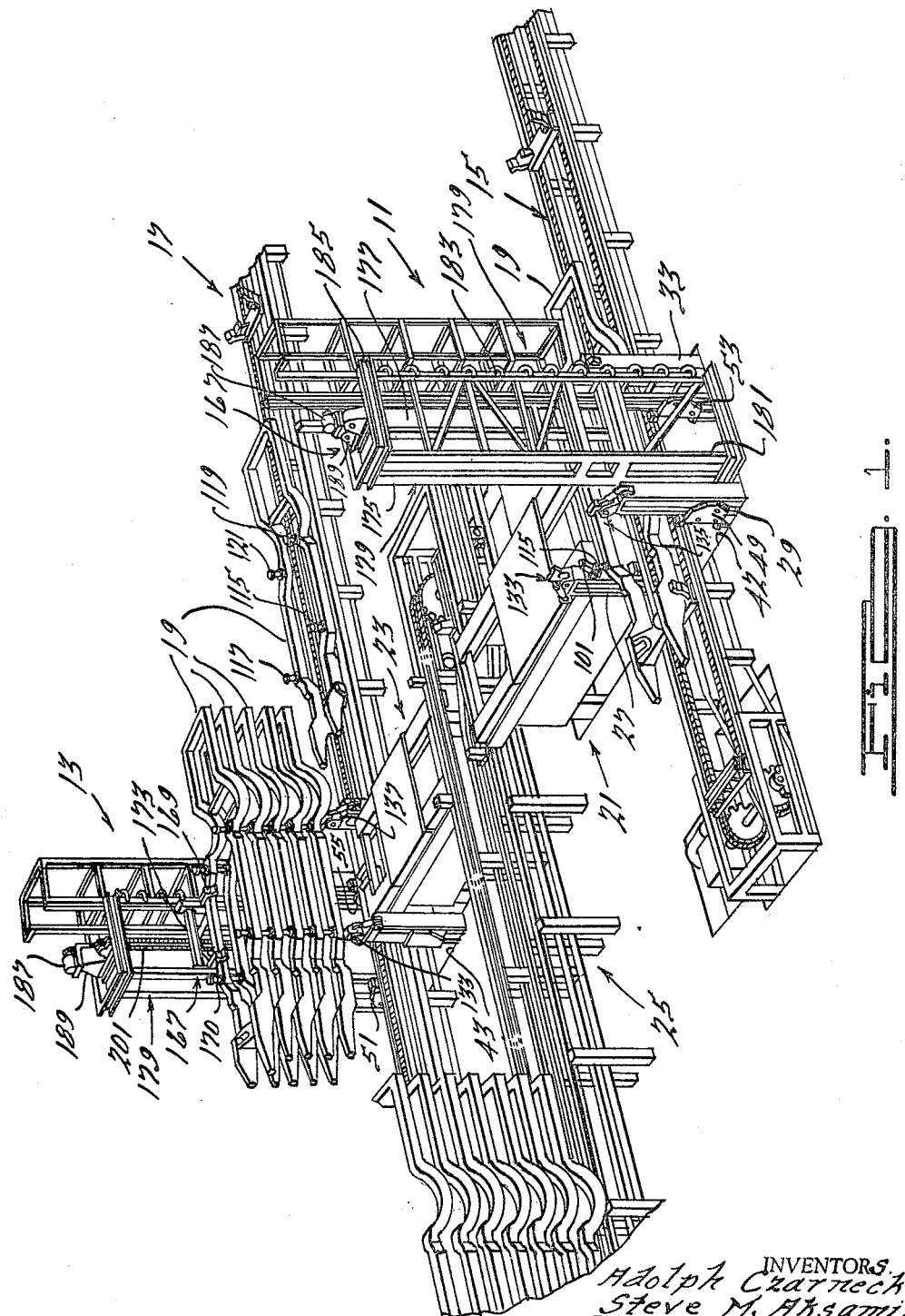
INVENTORS.
Adolph Czarnecki
Steve M. Aksamit
BY
Harness, Dickey & Pierce
ATTORNEYS

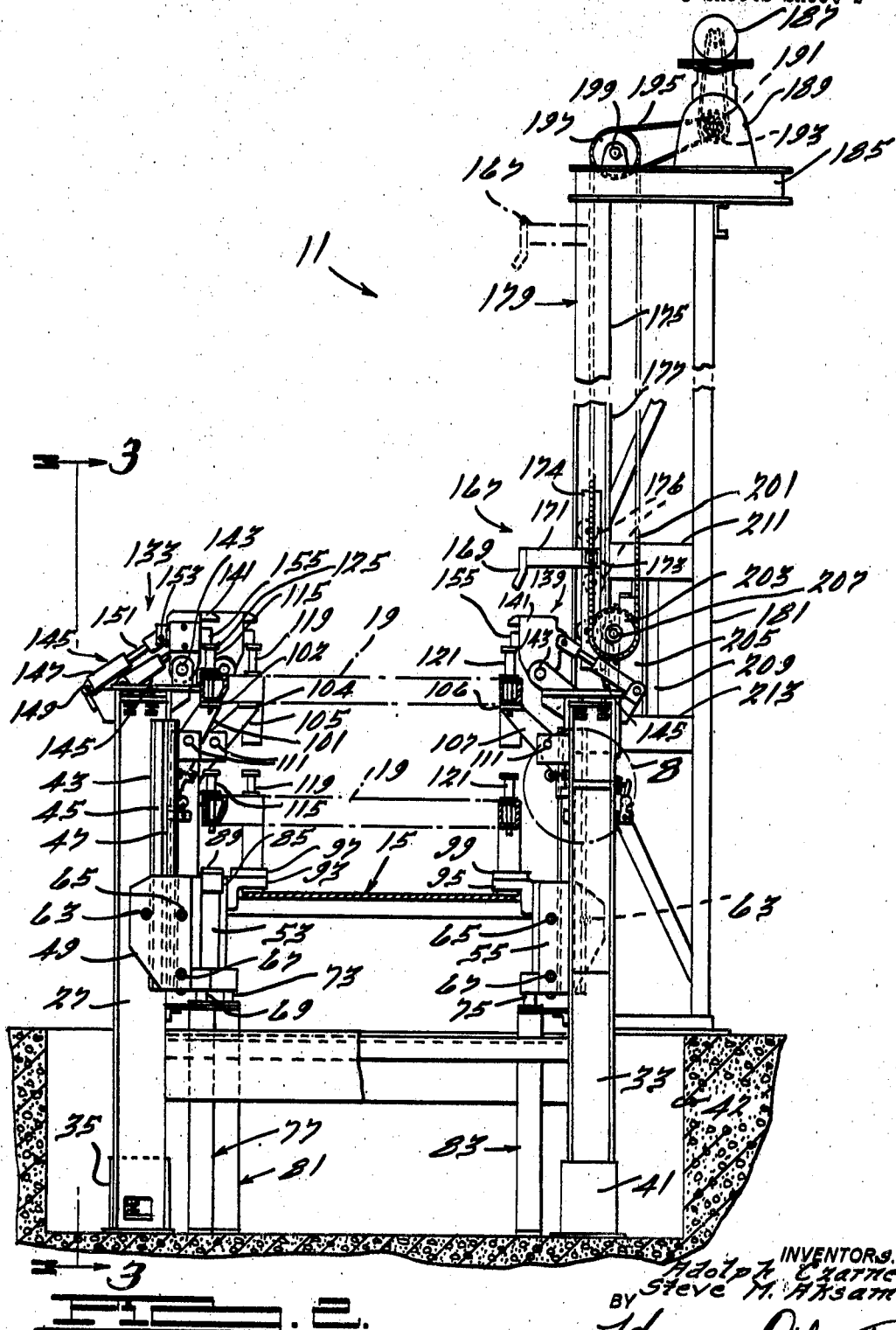

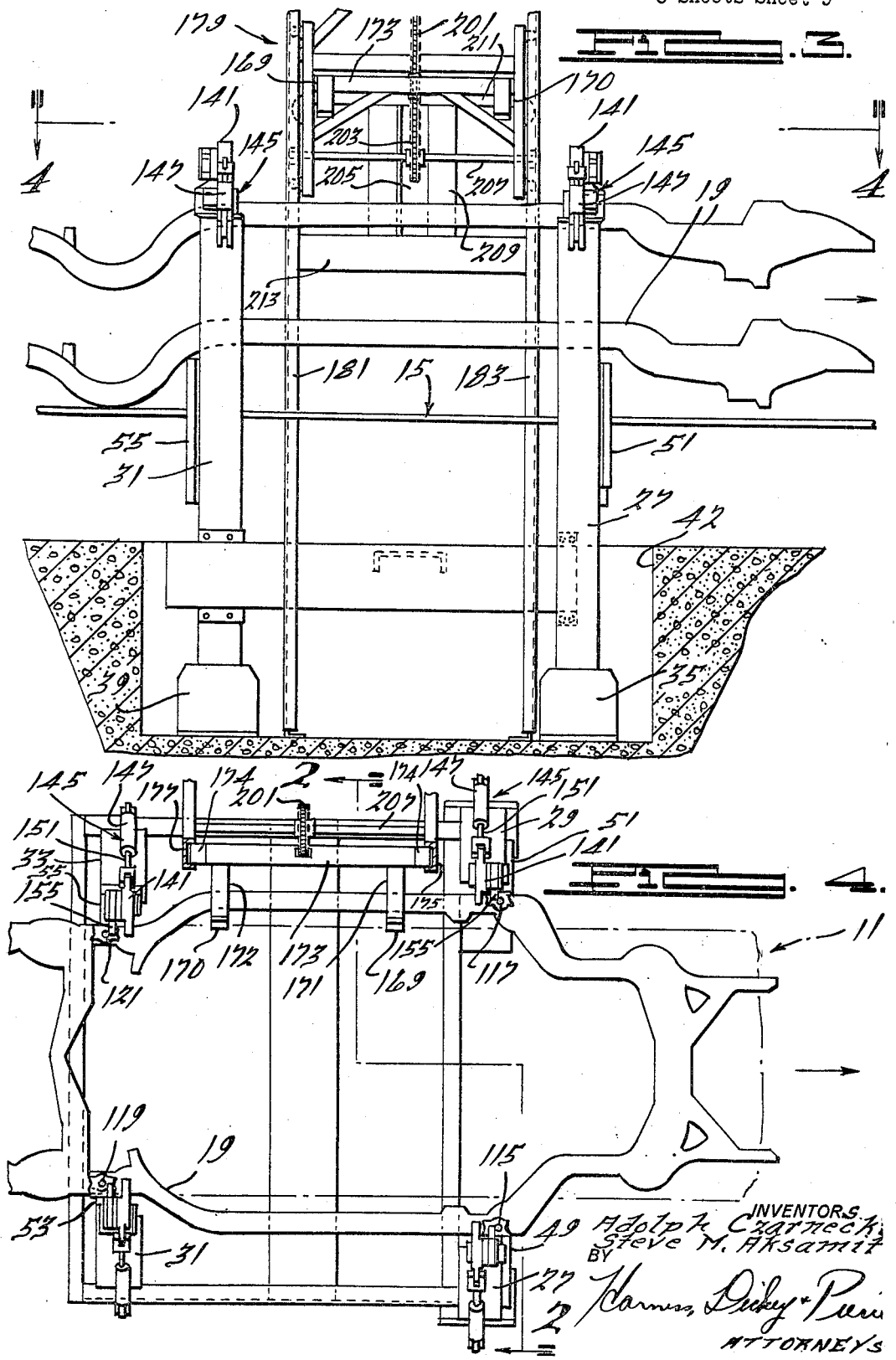

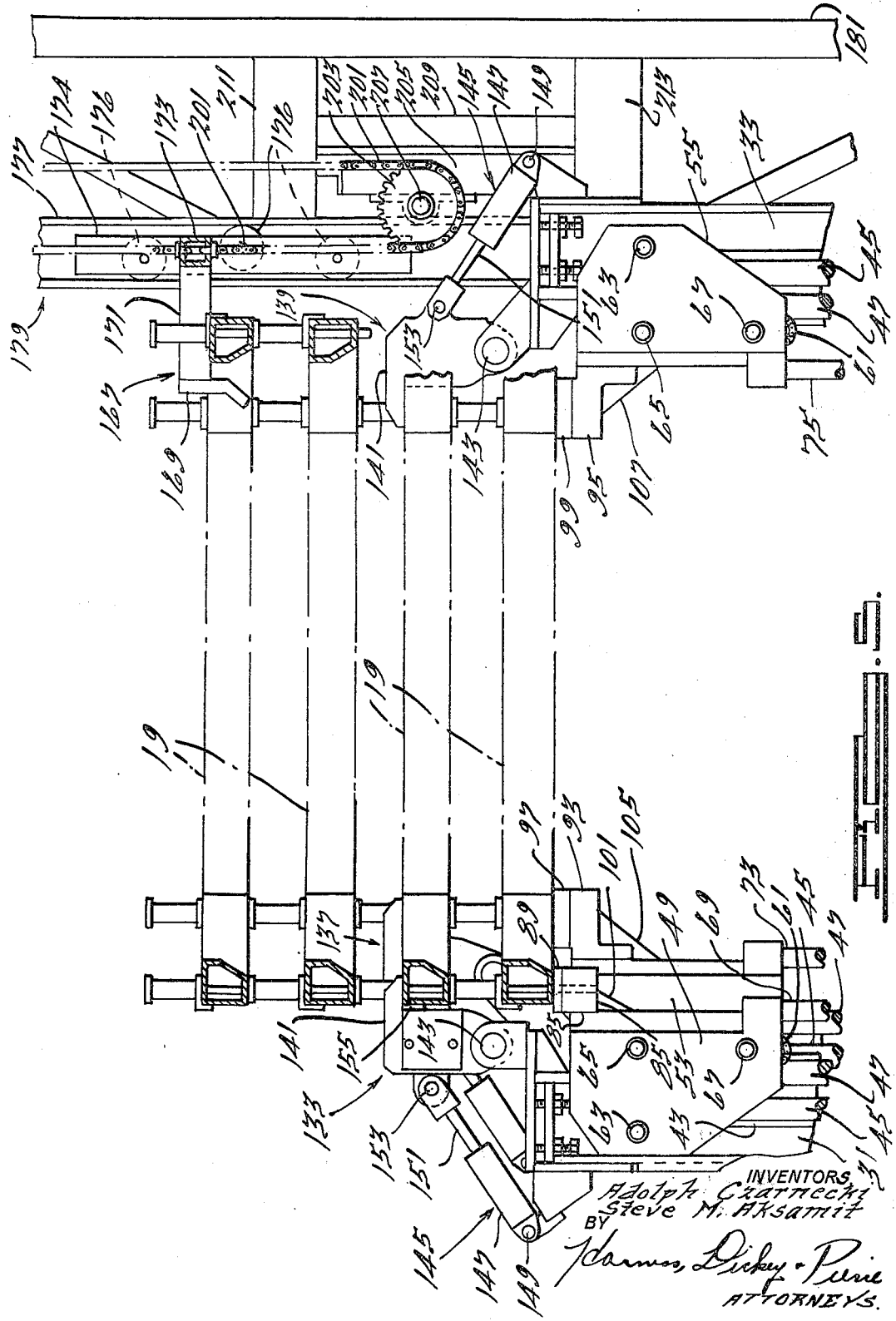

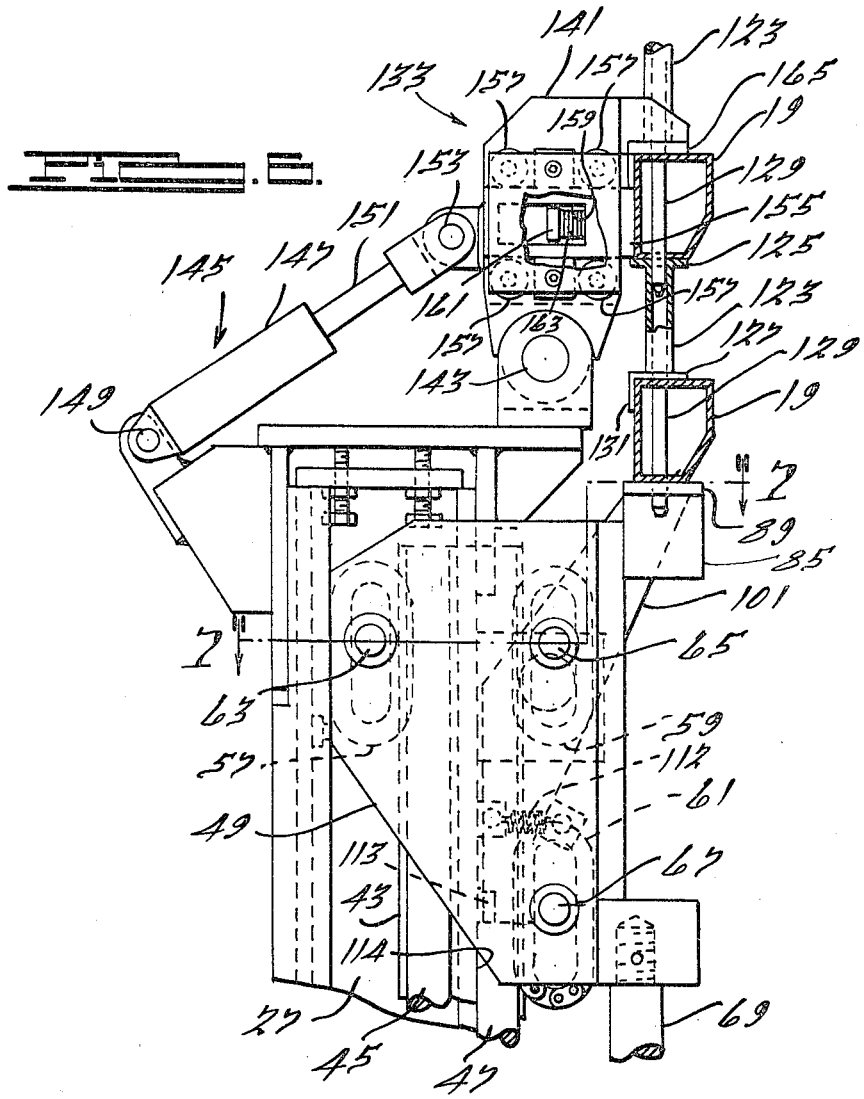

Jan. 20, 1970  A. CZARNECKI ET AL  3,490,610
AUTOMATIC FRAME STACKING DEVICE
Filed Sept. 20, 1965  6 Sheets-Sheet 6
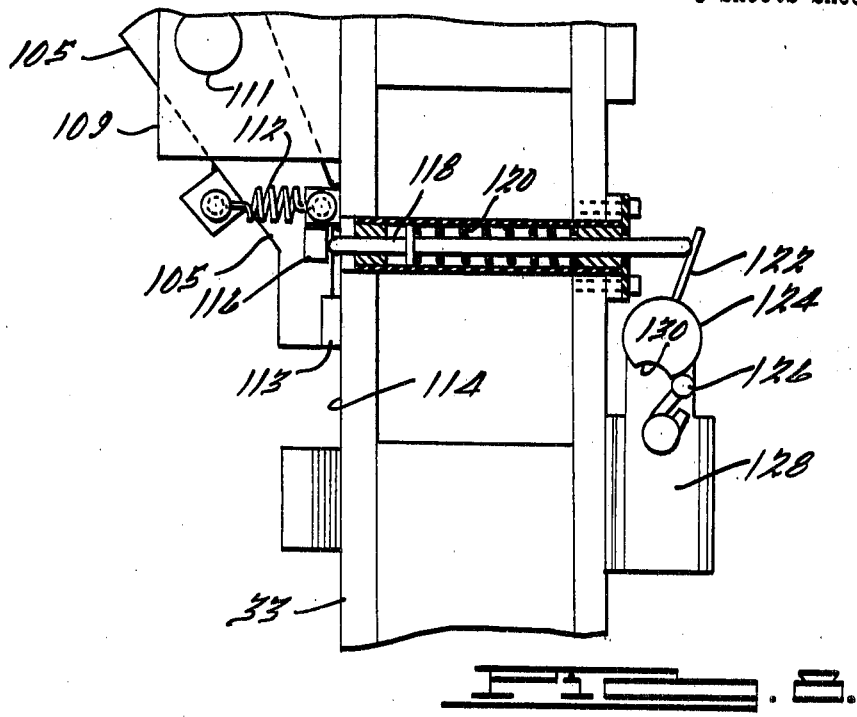
INVENTORS.
Adolph Czarnecki,
Steve M. Aksamit.
BY
Harness Dickey & Pierce
ATTORNEYS.

United States Patent Office 3,490,610
Patented Jan. 20, 1970

3,490,610
AUTOMATIC FRAME STACKING DEVICE
Adolph Czarnecki, Birmingham, and Steve M. Aksamit, Melvindale, Mich., assignors, by mesne assignments, to Standard Alliance Industries, Inc., Chicago, Ill., a corporation of Delaware
Filed Sept. 20, 1965, Ser. No. 488,521
Int. Cl. B65g *57/30, 1/14*
U.S. Cl. 214—6
19 Claims

ABSTRACT OF THE DISCLOSURE

A stacking device comprising means for elevating a series of workpieces to a position wherein each workpiece is disposed below and in supporting relation with respect to the workpieces previously elevated, support means normally disposed in a workpiece supporting position located in the path of the workpieces as they are elevated by the lift means and being movable to a retracted position upon engagement of the workpieces therewith, spacing and alignment means interposed between the workpieces as they are elevated by the lift means and hold-down means disposed adjacent the support means for assuring proper engagement of the spacing and alignment means with the workpieces and stabilizing means above the support means and movable vertically with the workpieces elevated by the lift means.

---

This invention relates generally to work handling, and particularly to a device adapted to automatically stack relatively large and heavy workpieces delivered thereto.

In many high production workpiece forming plants, it is often necessary for efficient handling that the formed workpieces be arranged in relatively large stacks in preparation for storage or delivery thereof to shipping vehicles. For most efficient handling, these workpieces should be arranged or stacked automatically after completion of the last operation thereon.

A number of problem areas exist in attempting to achieve rapid and efficient stacking of workpieces delivered from a forming mill, particularly where these workpieces are relatively large and heavy. Thus, the workpieces generally cannot be directly stacked, one on top of the other, since warpage or irregularities in the workpieces can cause the stack to be uneven and the resulting stack to tip over. Also, problems of complex controls, etc. for the stack forming structure are created by the stack as it progressively grows making it virtually impossible to stack succeeding workpieces on top of the stack. Furthermore, the size and weight of some relatively heavy workpieces makes more difficult the handling and stacking thereof at a rate consistent with the rate at which they are delivered from the forming or finishing process.

The main object of the present invention, therefore, is a device adapted to continuously and automatically stack relatively large and heavy workpieces continuously delivered from a forming mill conveyor.

Further objects include a stacking device of the above character adapted to stack the workpieces from the bottom of the stack and adapted to support and prevent the stack from tipping.

Additional objects of the present invention include a stacking device of the above character which is relatively inexpensive to manufacture, rugged in construction and reliable in use.

Other objects and advantages of the present invention will become more apparent from a consideration of the following detailed description taken in conjunction with the drawings in which:

FIGURE 1 is a perspective view illustrating a pair of stacking devices embodying the present invention and shown in a typical installation;

FIGURE 2 is a side elevational sectional view of one of the stacking devices illustrated in FIGURE 1, shown with one workpiece in place thereon and taken along the line 2—2 of FIGURE 4;

FIGURE 3 is an enlarged sectional view of the structure of FIGURE 2 taken along the line 3—3 thereof;

FIGURE 4 is a sectional view of the structure of FIGURE 3 taken along the line 4—4 thereof;

FIGURE 5 is an enlarged fragmentary side elevational view, partly in section, of one of the stacking devices illustrated in FIGURE 1 and shown with four workpieces in place on the stacker;

FIGURE 6 is an enlarged view, partly broken away, of a portion of FIGURE 5;

FIGURE 7 is a sectional view of FIGURE 6 taken along the line 7—7 thereof; and

FIGURE 8 is an enlarged view of a portion of the structure of FIGURE 2 taken within the circle 8 thereof.

Broadly described. the present invention includes a lift positioned beneath workpieces delivered thereto and movable vertically to place each workpiece on a retractable support and beneath and supporting a previously placed workpiece.

Referring now more specifically to the drawings and particularly FIGURE 1, illustrated there is a pair of stacking devices embodying the present invention and indicated generally at 11, 13. These stacking devices 11, 13 are shown in a typical installation at the exit ends of a respective pair of conveyors 15, 17 which deliver workpieces herein shown as automobile frames 19, from a frame forming and finishing mill (not shown). The stacking devices 11, 13 stack the workpiece frames 19, one on top of the other as shown and the stacks are transferred by transfer devices 21, 23 to a conveyor 25 which delivers the stacks to a storage area or transport vehicle (not shown). The stacking devices 11, 13 illustrated in FIGURE 1 are, with the exception of being reversed, identical and do not depend upon each other so that for the purposes of the present invention a description of one will suffice here, it being understood that like numerals indicate identical parts of the other stacking device 13.

Thus, the stacking device 11 is seen to include four spaced vertically extending beams 27, 29, 31, 33 each supported within and fixed to a respective one of four base members 35, 37, 39, 41 secured to the floor of a cavity 42. The beams 27, 31 are positioned on one side of the conveyor 15 opposite the beams 29, 33 while the beams 27, 29 are downstream of the beams 31, 33.

Each of the beams 27, 29, 31, 33 has fixed thereto a mounting plate 43 on each of which is secured a pair of spaced parallel guide posts 45, 47. See FIGURE 7. A set of four lifts, 49, 51, 53, 55 are each movable vertically on a pair of the guide posts 45, 47 fixed on each of the beams 27, 29, 31, 33, respectively, through trolley-type bearings 57, 59, 61 secured to each of the lifts 49, 51, 53, 55 by pins 63, 65, 67. Each of the lifts 49, 51, 53, 55 is secured to a piston rod 69, 71, 73, 75 of a lift motor 77, 79, 81, 83, respectively, also secured to the floor of the cavity 42. These motors 77, 79, 81, 83 are each supplied with fluid from a source (not shown) and are synchronized by a means (not shown) so that the piston rods 69, 71, 73, 75 synchronously reciprocate vertically causing the lifts 49, 51, 53, 55 also to synchronously move vertically on their guide posts 45, 47.

The lifts 49, 51 each have lift blocks 85, only one of which is shown, it being understood that these are identical. The lift blocks 85 are secured to the lifts 49, 51 at their inner and upper ends, respectively. Each of the blocks 85 has a lift pad 89 (only one of which is shown) on its top surface and is adapted, when the lifts 49, 51 are raised by energizing the motors 77, 79, to engage the lower surface of one of the workpiece frames 19 positioned therebetween on the conveyor 15. When the lifts 49, 51 are in their "down" position, the pads 89 are below the workpiece frame 19. The lifts 53, 55 each has an angle shaped lift support 93, 95 secured thereto at the upper portion of their inner sides for movement therewith. Each of the supports 93, 95 in turn has a lift pad 97, 99, fixed to the top surface thereof, respectively, and adapted to engage the lower surface of the workpiece frame 19 when raised by their motors 81, 83 in the same manner as the lift pads 89. As shown, the lift supports 93, 95 and their associated lift pads 97, 99 are positioned inwardly of the lift blocks 85 and their lift pads 89. This is necessary since the workpiece frame 19 is narrower adjacent the lift pads 97, 99 than adjacent the lift pads 89. It will be understood, however, that this arrangement can vary for different workpiece configurations.

In use, the lifts 49, 51, 53, 55 are "down" until one of the workpiece frames 19 is delivered thereabove by the conveyor 15, this conveyor being constructed to pause in its feeding movement with the workpiece frame 19 accurately positioned. A trip switch (not shown) may be actuated by the conveyor 15 or by this workpiece frame 19 to energize the motors 77, 79, 81, 83 and raise the lifts 49, 51, 53, 55, causing the lift pads 89, 97, 99 to engage the workpiece frame 19 and raise it from the conveyor 15 to a "stacking" position after which the motors 77, 79, 81, 83 are reversed or are exhausted to return the lifts 49, 51, 53, 55 to their original position ready to receive and raise a succeeding workpiece frame 19 delivered in the next feeding step of the conveyor 15. Control means of the type required here are conventional and are within the realm of the skilled engineer and since they form no part of the present invention, are not illustrated nor described in detail here.

Positioned above the lifts 49, 51, 53, 55 and mounted on and adjacent the top of a respective one of the beams 29, 31, 33, 35 are pivotal dogs, only three of which are shown at 101, 105, 107, it being understood that another dog (not shown) similar in all respects to dog 101 is mounted on the beam 31. As shown perhaps best in FIGURES 6 and 7, the dogs are each pivotally mounted within a channel-shaped block 109 by a pivot pin 111, each of the blocks 109 being welded or otherwise secured to their respective beams 27, 29, 31, 33. The lower, outer wall portion of each of the dogs 101, 105, 107 has a pad 113 thereon positioned to engage a surface 114 of a respective one of the beams 27, 29, 31, 33 and is normally held in engagement therewith by the weight of the dogs inwardly of the pivot or by a spring 112 fixed at one end to the dogs and at the other end to the beams 27, 29, 31, 33, respectively, to insure proper positioning of the dogs 101, 105, 107 during use (see FIGURES 6 and 8). As shown, the upper ends of the dogs 101, 105, 107 are, in this normal position, disposed in the path of the workpiece frame 19 when it is raised upwardly by the lifts 49, 51, 53, 55. Thus, during the lifting operation described above, the workpiece frame 19 engages the dogs 101, 105, 107 and pivots them outwardly about the pins 111 (the dog 101 pivoting counter-clockwise as seen in FIGURE 6 and the dog 105 pivoting clockwise as seen in FIGURE 8) until the workpiece frame 19 is above the dogs. These dogs 101, 105, 107 then pivot back to the position illustrated under the force of spring 112 so that when the lifts 49, 51, 53, 55 thereafter move downwardly, the workpiece frame 19 is left supported on pads 102, 104, 106 on the top surface of each of the dogs. This, then, is the beginning of the stacking operation.

Should, for any reason, the workpiece frame 19 fail to move upwardly past all of the dogs 101, 105, 107 during lifting so that one or more of these dogs is prevented from pivoting back to its normal position against the beam surface, 114, proper stacking has not taken place and it becomes necessary to signal or shut the device down until this has been corrected. To achieve this, each of the dogs 101, 105, 107 has a switch actuating block 116 fixed thereto and adapted to engage one end of a plunger 118 slidable within each of the beams 27, 29, 31, 33 and biased inwardly toward the stack by a spring 120 (only one of which is shown in FIGURE 8). The other end of these plungers 118 engages a respective one of a plurality of arms 122, each fixed to a pivotal cam 124. A pivotal switch arm 126 of a switch 128 mounted on each beam 27, 29, 31, 33 is normally held in engagement with the cam 124 and each is positionable in a recess 130 in the cam surface when its respective plunger 118 is not retracted by the block 116 on the dogs. Thus, if one side of the workpiece frame 19 has not been properly positioned on the dogs 101, 105, 107, this dog cannot pivot back to its normal position and its associated switch arm 126 will remain in the recess 130 of the cam 124. This condition can be made to effect a signal, if desired, or preferably can shut the entire system down until it can be corrected.

As described above, one of the problems involved in stacking workpieces of this type is that if the workpieces are stacked directly one on top of the other, the stack too easily can tip either because of irregularities in the workpieces causing uneven stacking or simply by one or more of the workpieces in the stack tending to slip or slide out of the stack. To overcome this difficulty, interengaging spacer pins are provided for the workpiece frames 19. Thus, as seen in FIGURE 1, each of the workpiece frames 19 as it is delivered by the conveyors 15, 17 has four pins 115, 117, 119, 121, positioned one each in a respective one of a plurality of holes in the workpiece frame which holes are aligned substantially with similar holes in the other workpiece frames. These holes preferably are formed in each workpiece frame 19 during the forming operation thereof. As seen best in FIGURES 5 and 6, each of the pins includes a tubular upper portion 123 terminating in a top flange 125 and a lower flange 127 adapted to seat on the top of the workpiece frame 19. A solid portion 129 extends downwardly from the lower flange 127 and beyond the bottom of the workpiece frame 19. A skirt portion 131 integral with the lower flange 127 engages the side of the workpiece frame 19 and prevents the pins from turning.

The pins 115, 117, 119, 121 are placed in the openings in the workpiece frames 19 manually while the workpieces are on the conveyors 13, 15 and before the workpiece frames reach the stackers 11, 13. As each workpiece is raised and placed on the dogs 101, 105, 107 by the lifts 49, 51, 53, and 55 (reference again being made only to the stacker 11), the pins 115, 117, 119, 121 remain in place on the workpiece frames 19 so that the pins in succeeding ones of the workpiece frames are aligned with and receive the solid portion 129 of the pins of previous workpiece frames in the tubular portion 123 of the pins of succeeding workpiece frames, substantially as shown in FIGURE 6. The tubular portion 123 of the pins 115, 117, 119, 121 is slightly larger than the solid portion 129 to freely receive the same. Thus, as the workpiece frames 19 are stacked, they are spaced vertically a distance equal to the length of the tubular portion 123 and the flanges 125, 127, and the interengaging solid portion 129 and hollow portion 123 prevent each of the workpiece frames 19 from slipping or sliding laterally out of the stack.

In use, the weight of each workpiece frame 19 as it rests on the dogs 101, 105, 107, after the first or top one in the stack, holds each of the pins 115, 117, 119, 121 down so that when the next workpiece frame 19 is raised by the lifts 49, 51, 53, 55 to a position above the dogs, the solid portions 129 of the pins on the previous workpiece frame 19 are fitted in the hollow pin portion 123 of the pins on this next workpiece frame 19 even if some misalignment of these pins exists. However, the first or top workpiece frame 19 in place on the dogs 101, 105, 107, of course, has no other workpiece frame 19 above it to hold the pins 115, 117, 119, 121 thereon down and insure proper interengagement with the pins on the second workpiece frame should these pins be slightly misaligned.

To insure proper interengagement of the pins on the first and second workpiece frames 19, a plurality of hold-downs shown generally at 133, 135, 137, 139 are mounted one each upon each of the beams 27, 29, 31, 33 and adjacent each of the pins 115, 117, 119, 121, respectively. Since each of these hold-downs 133, 135, 137, 139 is identical, a description of one will suffice here, and it is understood that like numerals refer to identical parts of the other hold-downs.

Thus, as shown in FIGURE 6, the hold-down 133 includes a clamp 141 having an inverted, generally L-shaped configuration and pivotally mounted at its bottom on the top of the beam 27 by a pivot pin 143. A motor 145 has a cylinder 147 pivotally mounted on the rear of the beam 27 by a pivot pin 149 and a piston rod 151 slidable therewithin pivotally secured to the clamp 141 by a pivot pin 153. The piston rod 151 is shown in FIGURE 6 in its fully extended position and when fluid is admitted to the cylinder 147 to retract the piston rod 151, the clamp 141 is swung in a counterclockwise direction as viewed in the figure and away from the workpiece frames 19.

The clamp 141 has a plunger 155 slidably disposed therein on rollers 157 rotatably secured thereto and laterally offset therefrom. The plunger 155 has a recess 159 receiving a channel block 161 fixed to the clamp 141. A compression spring 163 has one end seated against the forward or inner surface of the channel block 161 and its other end seated against the plunger 155 within the recess 159. The spring 163 normally biases the plunger 155 in a right-hand direction as seen in FIGURE 6 and movement of the plunger 155 in this direction is limited by engagement between the rear wall of the recess 159 and the channel block 161.

The plunger 155 is shown in its "extended" position in FIGURE 2 where its bottom surface seats on the flange 125 on the top of the pin hollow portion 123. Thus, when the first workpiece frame 19 is placed on the dogs 101, 105, 107 and the hold-downs 133, 135, 137, 139 are in the position illustrated in the figures, the plungers 155 of the hold-downs engage the top of the pins 115, 117, 119, 121, respectively, and hold them "down" so that their lower solid portions 129 are securely seated in the tubular portions 123 of the pins 115, 117, 119, 121 on the next workpiece frame 19 as it is lifted into place thereunder by the lifts 49, 51, 53, 55. The motors 145 for each of the hold-downs 133, 135, 137, 139 are conventionally synchronously operated by switch means (not shown) preferably on or actuated by one of the lifts 49, 51, 53, 55 so that when these lifts are raised sufficiently to bring the second workpiece frame 19 into position below the first workpiece frame, the hold-downs 133, 135, 137, 139 are retracted or pivoted away from the first workpiece frame 19 so that it can be raised slightly as the second workpiece frame moves upwardly past the dogs 101, 105, 107. As with the first lifting sequence, the lifts 49, 51, 53, 55 are then lowered, this time seating the second workpiece frame 19 on the dogs 101, 105, 107. Thereafter, the motors 145 of the hold-downs 133, 135, 137, 139 are reversed to reposition each of the clamps 141 to the position illustrated. However, as shown in FIGURE 6, the first workpiece frame 19 now is opposite and engages the plunger 155 of each hold-down 133, 135, 137, 139 to bias it rearwardly or to the left as seen in FIGURE 6 against the action of the spring 163. Since the weight of the first workpiece frame 19 holds the pins 115, 117, 119, 121 on the second workpiece frame 19 "down," the plungers 155 are not needed to insure proper interengagement of these pins on the second and third frames. Likewise, the weight of the first and second workpiece frames 19 holds the pins 115, 117, 119, 121 of the third workpiece frame "down" for proper interengagement with the pins on the fourth workpiece frame and so on until a full stack of workpiece frames 19 is completed.

In addition to the weight of the workpiece frames 19 after two such workpiece frames 19 are stacked, the clamps 141 also serve to hold the pins 115, 117, 119, 121 of the lowermost workpiece frame "down" to insure proper pin interengagement. As seen in FIGURE 6, the clamps 141 have a downwardly facing pad 165 thereon adapted to engage the upper surface of the workpiece frame 19 which is next to the lowermost one in the stack. These pads 165 serve to hold this workpiece frame 19 "down" and therefore the pins 115, 117, 119, 121 on the lowermost workpiece frame. When the next workpiece frame 19 is raised by the lifts 49, 51, 53, 55 from the conveyor 15 to a position where its pins 115, 117, 119, 121 engage the pins on the lowermost workpiece frame seated on the dogs 101, 105, 107, the clamps 141 are retracted by the motors 145 as described above. Thereafter, the motors 145 are reversed after the new workpiece fram 19 is seated on the dogs 101, 105, 107 and the clamp pads 165 repositioned on the now second from lowermost workpiece frame 19. However, should proper interengagement between the pins 115, 117, 119, 121 of the two lowermost workpiece frames 19 fail to occur for any reason, the top surface of the second from the lowermost workpiece frame 19 will prevent full movement of the clamps 141 to the position illustrated. This, in turn, can actuate means, such as, for example, a switch (not shown) to signal or shut down the stacking mechanism until this condition is corrected.

The stacking operation continues with each succeeding workpiece frame 19 being positioned on the bottom of the stack. As the stack grows progressively higher, there is an increased tendency for it to tip over. To prevent this, a stack stabilizer generally indicated at 167 is provided adjacent the stacker 11. As seen in FIGURE 2, this stabilizer 167 includes a pair of spaced downwardly depending arms 169, 170 each fixed to one end of a pair of support arms 171, 172, the opposite ends of which support arms are fixed to an elongated bar 173. Each end of the bar 173 is fixed to a vertically extending post 174, each of which is provided with spaced rollers 176 guidably received in vertically extending channels 175, 177 forming part of a tower 179. The lower ends of the channels 175, 177 extend into and are supported on the floor of the cavity 42 while the upper ends thereof extend above the top of the beams 27, 29, 31, 33 and are secured together and to a pair of spaced supporting posts 181, 183 by a rectangular frame 185.

The height of the frame 185 more or less determines the stack height and has fixed thereto a reversible electric drive motor 187 and reducer 189. An output shaft 191 of the reducer 189 has a sprocket 193 secured thereto over which an endless chain 195 passes. The chain 195 also passes over another sprocket 197 mounted upon the frame 185 by a stub shaft 199. Another endless chain 201 passes over the sprocket 197 and over another sprocket 203 rotatably supported on a mounting plate 205 by a shaft 207, the mounting plate 205, in turn, being secured to the tower 179 by vertical and horizontal struts 209 and 211, 213, respectively. The chain 201 extends through and is fixed to the bar 173 so that when the motor 187 is energized to drive the chains 195, 201, the bar 173 is moved vertically relative to the tower 179, being guided by the channels 175, 177. This, of course, causes the stabilizer 167, of which the bar 173 is an integral part, also to move vertically.

The downwardly depending arms 169, 170 are adapted to fit inside one side portion of the top workpiece frame 19 in the stack and to move vertically upwardly on the tower 179 as the stack grows progressively higher. Manifestly, the drive motor 187 is interconnected by a control means for synchronous operation with the lift motors 77, 79, 81, 83 so that when these lift motors raise each workpiece frame 19 onto the dogs 101, 105, 107 and increase the stack height, the motor 187 raises the stabilizer 167 a corresponding distance with the stabilizer at all times preventing the stack from tipping inwardly or away from the tower 179. Of course, the tower 179 itself prevents the stack from tipping outwardly.

When the stack reaches a predetermined height, it is neccssary that it be removed from the stacker 11 by a suitable stack transfer device which may be actuated by movement of the stack stabilizer 167. Thus, for example, when this stabilizer 167 reaches a predetermined height, such as is shown in dot-dash lines in FIGURE 2, it may engage a trip switch (not shown) which actuates the stack transfer device illustrated generally at 21 in FIGURE 1, moving the transfer table thereof beneath the lowermost workpiece frame 19 positioned on the dogs 101, 105, 107. The motor 187 is then energized to raise the stabilizer 167 above and clear of the stack to permit it to be lifted and transferred away from the stacker 11. This sequence then can conveniently serve to reverse rotation of the motor 187 to lower the stabilizer 167 to a position ready for the succeeding stack built upon the stacker 11.

While most of the various switches, controls and fluid pressure sources and conduits have been omitted from the drawings, it will be understood that these are well known in the art and are within the realm of the skilled engineer. Since they form no part of the present invention, they are neither illustrated nor described in detail here.

Thus, a relatively simple but effective workpiece stacking device calculated to fulfill the aforementioned objects is seen to be provided by the present invention and while a preferred embodiment has been illustrated and described in detail, various additions, substitutions, modifications and omissions may be made thereto without departing from the spirit of the invention as encompassed by the appended claims.

What is claimed is:

1. A stacking device comprising a lift positioned below a workpiece delivery station, means actuating said lift to engage and raise a workpiece from said station and place it on a retractable support positioned thereabove and thereafter lowering said lift to below said station, said lift being thereafter actuated to raise another workpiece at said delivery station and place it beneath and in supporting relation to said first-mentioned workpiece, a stabilizer above said support and adapted to engage said first-mentioned workpiece, means moving said stabilizer vertically upwardly as additional workpieces are placed upon said support, and means for spacing and aligning the workpieces as they are elevated by said lift means and holddown means for assuring proper engagement of said spacing and aligning means with the workpieces.

2. A stacking device comprising a lift positioned below a workpiece delivery station, means actuating said lift to engage and raise a workpiece from said station and place it on a retractable support positioned thereabove and thereafter lowering said lift to below said station, said lift being thereafter actuated to raise another workpiece at said delivery station and place it beneath and in supporting relation to said first-mentioned workpiece, each said workpiece having means thereon adapted to align with complementary means on each other workpiece to support said workpieces in aligned spaced relation when on said support.

3. A stacking device comprising a lift positioned below a workpiece delivery station, means actuating said lift to engage and raise a workpiece from said station to above and on a support and thereafter lowering said lift to below said station, said support including a plurality of retractable dogs positioned above said station, means biasing said dogs to a position normally in the path of said workpiece as it is raised, said dogs being retractable by engagement with said workpiece, said dogs thereafter moving into a workpiece supporting position when said workpiece is raised thereabove, said lift being unobstructed in its movement by said retractable dogs, means on each of said workpieces adapted to register with and engage complementary means on the other of said workpieces to support and align said workpieces as they are raised by said lift.

4. A stacking device comprising a lift positioned below a workpiece delivery station, means actuating said lift to engage and raise a workpiece from said station and place it on a retractable support positioned thereabove and thereafter lowering said lift to below said station, said workpiece having a plurality of spaced removable pins extending therethrough and supported thereon, retractable hold-down means above said support and engageable with each said pin when said workpiece is positioned on said support, said lift being thereafter actuated to raise another workpiece from said delivery station and place it on said support, said last-mentioned workpiece having four spaced removable pins thereon aligned with said pins on said first-mentioned workpiece, said pins having complementary interengageable portions supporting said first and last-mentioned workpieces in spaced relation on said support, said hold-down means insuring proper interengagement between said pins of said workpieces when said last-mentioned workpiece is positioned on said support.

5. A stacking device comprising a lift positioned below a workpiece delivery station, means actuating said lift to engage and raise a workpiece from said station and place it on a retractable support positioned thereabove and thereafter lowering said lift to below said station, said workpiece having a plurality of spaced removable pins extending therethrough and supported thereon, said pins including a hollow tubular upper portion positioned above said workpiece and a solid portion extending therethrough to below said workpiece, retractable hold-down means above said support and engageable with the top of each said pin when said workpiece is positioned on said support, said lift being thereafter actuated to raise another workpiece from said delivery station and place it on said support, said last-mentioned workpiece having spaced removable pins thereon identical to and aligned with said pins on said first-mentioned workpiece, said solid portion of said pins on said first-mentioned workpiece being interengageable with said tubular portions of said pins on said last-mentioned workpiece supporting said first and last-mentioned workpieces in spaced relation on said support, said hold-down means insuring proper interengagement between said pins of said workpieces when said last-mentioned workpiece is positioned on said support.

6. A stacking device comprising a lift positioned below a workpiece delivery station, means actuating said lift to engage and raise a workpiece from said station and place it on a retractable support positioned thereabove and thereafter lowering said lift to below said station, said workpiece having a plurality of spaced removable pins extending therethrough and supported thereon, hold-down means above said support, said hold-down means including pivotally mounted means having plunger means normally biased outwardly thereof engageable with each said pin when said workpiece is positioned on said support, said lift being thereafter actuated to raise another workpiece from said delivery station and place it on said support, said last-mentioned workpiece having spaced removable pins thereon aligned with said pins on said first-mentioned workpiece, said pins having complementary interengageable portions supporting said first and last-mentioned workpieces in spaced relation on said support, said hold-down means insuring proper interengagement between said pins of said workpieces when said last-mentioned workpiece is positoned on said support.

7. A stacking device comprising a lift positioned below a workpiece delivery station, means actuating said lift to engage and raise a workpiece from said station and place it on a retractable support positioned thereabove and thereafter lowering said lift to below said station, said workpiece having a plurality of spaced removable pins extending therethrough and supported thereon, hold-down means above said support, said hold-down means including pivotally mounted means having plunger means normally biased outwardly thereof engageable with each said pin when said workpiece is positioned on said support, said lift being thereafter actuated to raise another workpiece from said delivery and place it on said support, said last-mentioned workpiece having spaced removable pins thereon aligned with said pins on said first-mentioned workpiece, said pins having complementary interengageable portions supporting said first and last-mentioned workpieces in spaced relation on said support, said hold-down means insuring proper interengagement between said pins of said workpieces when said last-mentioned workpiece is positioned on said support, and means retracting said pivotally mounted means away from said workpiece as each said workpiece is positioned on said support, said plunger means being engageable with said first-mentioned workpiece and retracted within said pivotally mounted means when said pivotally mounted means is moved back toward said workpiece and said last-mentioned workpiece is on said support.

8. A stacking device comprising a lift positioned below a workpiece delivery station, means actuating said lift to engage and raise a workpiece from said station and place it on a retractable support positioned thereabove and thereafter lowering said lift to below said station, said workpiece having a plurality of spaced removable pins extending therethrough and supported thereon, hold-down means above said support, said hold-down means including pivotally mounted means having plunger means normally biased outwardly thereof engageable with each said pin when said workpiece is positioned on said support, said lift being thereafter actuated to raise another workpiece from said delivery station and place it on said support, said last-mentioned workpiece having spaced removable pins thereon aligned with said pins on said first-mentioned workpiece, said pins having complementary interengageable portions supporting said first and last-mentioned workpieces in spaced relation on said support, said hold-down means insuring proper interengagement between said pins of said workpieces when said last-mentioned workpiece is positioned on said support, and means retracting said pivotally mounted means away from said workpiece as each said workpiece is positioned on said support, said plunger means being engageable with said first-mentioned workpiece and retracted within said pivotally mounted means when said pivotally mounted means is moved back toward said workpiece and said last-mentioned workpiece is on said support, said pivotally mounted means having clamp means engageable with the top surface of said first-mentioned workpiece when said pivotally mounted means is moved back toward said workpiece and said last-mentioned workpiece is on said support.

9. A stacking device comprising a lift positioned below a workpiece delivery station, means actuating said lift to engage and raise a workpiece from said station and place it on a retractable support positioned thereabove and thereafter lowering said lift to below said station, said workpiece having four spaced removable pins extending therethrough and supported thereon, four hold-down means above said support and engageable with each said pin when said workpiece is positioned on said support, said lift being thereafter actuated to raise another workpiece from said delivery station and place it on said support, said last-mentioned workpiece having four spaced removable pins thereon aligned with said pins on said first-mentioned workpiece, said pins having complementary interengageable portions supporting said first and last-mentioned workpieces in spaced relation on said support, said hold-down means insuring proper interengagement between said pins of said workpieces when said last-mentioned workpiece is positioned on said support.

10. A stacking device comprising a lift positioned below a workpiece delivery station, means actuating said lift to engage and raise a workpiece from said station and place it on a retractable support positioned thereabove and thereafter lowering said lift to below said station, said lift being thereafter actuated to raise another workpiece at said delivery station and place it beneath and in supporting relation to said first-mentioned workpiece, a stabilizer above said support and adapted to engage said first-mentioned workpiece, said stabilizer including a pair of arms guidably received in vertically extending guides, said arms having depending portions positioned within said first-mentioned workpiece, means moving said stabilizer vertically upwardly as additional workpieces are placed upon said support and means for moving said stabilizer clear of said workpieces to permit transfer thereof from said stacking device.

11. A stacking device comprising means for elevating a series of workpieces to a position wherein each workpiece is disposed below and in supporting relation with respect to the workpieces previously elevated, support means normally disposed in a workpiece supporting position located in the path of said workpieces as they are elevated by said lift means and being movable to a retracted position upon engagement of said workpieces therewith, spacing and alignment means interposed between said workpieces as they are elevated by said lift means and hold down means disposed adjacent said support means for assuring proper engagement of said spacing and alignment means with said workpieces, and stabilizing means above said support means and movable vertically with said workpieces elevated by said lift means.

12. A stacking device comprising means for elevating a series of workpieces to a position wherein each workpiece is disposed below and in supporting relation with respect to the workpieces previously elevated, support means normally disposed in a workpiece supporting position located in the path of said workpieces as they are elevated by said lift means and being movable to a retracted position upon engagement of said workpieces therewith, and spacing and alignment means interposed between said workpieces as they are elevated by said lift means and holddown means disposed adjacent said support means for assuring proper engagement of said spacing and alignment means with said workpieces.

13. A stacking device comprising lift means for elevating a series of workpieces to a position wherein each workpiece is disposed below and in supporting relation with respect to the workpieces previously elevated, spacing and alignment means disposed between said workpieces as they are elevated by said lift means and hold-down means for assuring proper engagement of said spacing and alignment means with said workpieces, and stabilizing means disposed above said lift means and movable vertically with the workpieces elevated by said lift means.

14. A stacking device comprising lift means for elevating a series of workpieces to a position wherein each workpiece is disposed below and in supporting relation with respect to the workpieces previously elevated, support means normally disposed in a workpiece supporting position located in the path of said workpieces as they are elevated by said lift means and being movable to a retracted position upon engagement of said workpieces therewith, stabilizing means disposed above said support means and movable vertically with the workpieces elevated by said lift means, and means for effecting spacing and alignment of the workpieces as they are elevated by said lift means, said spacing and alignment means comprising a plurality of detachable pin elements provided at least one on each of the workpieces, said pin elements having complementary shaped portions at opposite ends adapted for interfitting of pins on one workpiece with that of the pins of the workpiece below it in the stack to prevent lateral movement of the workpiece within the stack, said pins having abutment means for vertical spacing of the workpieces in the stack.

15. In a stacking device comprising lift means for elevating a series of workpieces, the improvement which includes support means normally disposed in a workpiece supporting position located in the path of the workpieces as they are lifted by the lift means and being movable to a retracted position upon engagement of the workpieces therewith, spacing and alignment means interposed between the workpieces as they are elevated by the lift means and hold-down means disposed adjacent a support means for assuring proper engagement of said spacing and alignment means with said workpieces, and stabilizing means disposed above said support means and movable vertically with the workpieces elevated by the lift means.

16. A stacking device comprising lift means for elevating a series of workpieces to a position wherein each of the workpieces is disposed below and in supporting relation with respect to the workpieces previously elevated, support means normally disposed in a workpiece supporting position located in the path of said workpieces as they are elevated by said lift means and being movable to a retracted position upon engagement of said workpieces therewith, spacing and alignment means interposed between said workpieces as they are elevated by said lift means and hold-down means disposed adjacent said support means for assuring proper engagement of said spacing and alignment means with said workpieces, and a stabilizer disposed above said support means and adapted to engage the first workpiece elevated by said lift means, said stabilizer including a pair of arms slidably received in vertically extending guides, said arms having depending portions positioned adjacent said first elevated workpiece and means moving said stabilizer vertically upward as additional workpieces are elevated by said lift means and means for moving said stabilizer clear of said workpieces to permit transfer thereof from said stacking device.

17. A stacking device comprising lift means for elevating a series of workpieces to a position wherein each workpiece is disposed below and in supporting relation with respect to the workpieces previously elevated, support means normally disposed in a workpiece supporting position located in the path of said workpieces as they are elevated by said lift means and being movable to a retracted position upon engagement of said workpieces therewith, stabilizing means disposed above said support means and movable vertically with the workpieces elevated by said lift means, said workpieces having a plurality of spaced removable pins extending therethrough and supported thereon, retractable hold-down means disposed above said support means and engageable with said pins when said workpieces are positioned on said support means, said hold-down means insuring proper interengagement between said pins and said workpieces when the last of a series of workpieces are elevated by said lift means.

18. A stacking device comprising lift means for elevating a series of workpieces to a position wherein each workpiece is disposed below and in supporting relation with respect to the workpieces previously elevated, spacing and alignment means interposed between said workpieces as they are elevated by said lift means and holding means for assuring proper engagement of said spacing alignment means with said workpieces, stabilizing means movable vertically with the workpieces elevated by said lift means, and support means including a plurality of pivotally mounted retractable dogs positioned above said lift means, said dogs each having a workpiece supporting head normally positioned in the path of said workpieces as they are elevated and pivotable away therefrom by engagement between said dogs and said workpieces, said dogs thereafter moving into a workpiece supporting position once a workpiece is elevated thereabove.

19. A stacking device comprising a lift positioned below a workpiece delivery station, means actuating said lift to engage and raise a workpiece from said station and place it on a support means located thereabove and thereafter lowering said lift to below said station, said lift including a plurality of lift pads movable vertically in synchronism and adapted to engage a workpiece at its lower surface thereof and raise it above said support means, said support means normally disposed in a workpiece supporting position located in the path of said workpieces as they are elevated by said pads and being movable to a retracted position upon engagement of said workpieces therewith, spacing and alignment means interposed between said workpieces as they are elevated by said pads and hold-down means disposed adjacent said support means for assuring proper engagement of said spacing and alignment means with said workpieces, and stabilizing means disposed above said support means and movable vertically with said workpieces elevated by said pads.

References Cited

UNITED STATES PATENTS

| | | | |
|---|---|---|---|
| 2,133,260 | 10/1938 | Wolff. | |
| 2,933,207 | 4/1960 | Edmonds et al. | |
| 3,171,550 | 3/1965 | Gajdostik et al. | 214—6 |
| 3,310,183 | 3/1967 | Paquette. | |
| 2,332,905 | 10/1943 | Fish et al. | 214—7 |
| 2,549,975 | 4/1951 | Knitter | 214—6 |
| 2,792,950 | 5/1957 | Fenton et al. | 214—6 |
| 3,030,867 | 4/1962 | Wright | 214—6 |
| 3,054,515 | 9/1962 | Nawman | 214—6 |

FOREIGN PATENTS

| | | |
|---|---|---|
| 629,209 | 1/1963 | Belgium. |
| 372,034 | 5/1932 | Great Britain. |
| 100,841 | 11/1962 | Norway. |

ROBERT G. SHERIDAN, Primary Examiner

FRANK E. WERNER, Assistant Examiner

U.S. Cl. X.R.

214—10.5